(12) United States Patent
Morita

(10) Patent No.: US 11,336,777 B2
(45) Date of Patent: May 17, 2022

(54) IMAGE PROCESSING APPARATUS, CONTROL METHOD FOR IMAGE PROCESSING APPARATUS, AND STORAGE MEDIUM

(71) Applicant: CANON KABUSHIKI KAISHA, Tokyo (JP)

(72) Inventor: Hiroyasu Morita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/946,647

(22) Filed: Jun. 30, 2020

(65) Prior Publication Data

US 2021/0014364 A1 Jan. 14, 2021

(30) Foreign Application Priority Data

Jul. 8, 2019 (JP) .............................. JP2019-126617

(51) Int. Cl.
*H04N 1/00* (2006.01)
*H04N 1/333* (2006.01)

(52) U.S. Cl.
CPC ....... *H04N 1/00209* (2013.01); *H04N 1/0014* (2013.01); *H04N 1/33376* (2013.01)

(58) Field of Classification Search
CPC ........... H04N 1/00212; H04N 1/00225; H04N 1/0014
See application file for complete search history.

(56) References Cited

U.S. PATENT DOCUMENTS

| 2004/0139164 | A1* | 7/2004 | Kanaya | H04L 67/02 709/206 |
| 2006/0277229 | A1* | 12/2006 | Yoshida | G06F 16/93 |
| 2011/0035454 | A1* | 2/2011 | Tsuboi | H04N 1/00214 709/206 |
| 2013/0308167 | A1* | 11/2013 | Nishiyama | H04L 51/24 358/402 |
| 2019/0104219 | A1* | 4/2019 | Morita | H04N 1/0022 |

FOREIGN PATENT DOCUMENTS

| JP | 2004157595 A | 6/2004 |
| JP | 2013243541 A | 12/2013 |

* cited by examiner

*Primary Examiner* — Benjamin O Dulaney
(74) *Attorney, Agent, or Firm* — Carter, DeLuca & Farrell LLP

(57) ABSTRACT

There is provided an image processing apparatus that is characterized by: reading an original document and generating image data; performing transmission of an electronic mail to which the image data is attached; performing, according to an end of the transmission of the electronic mail, transmission of an end notification mail for notifying the end of the transmission of the electronic mail; setting a transmission destination to which the end notification mail is transmitted; and deciding whether or not to permit the attachment of the image data to the end notification mail, according to the transmission destination.

9 Claims, 13 Drawing Sheets

[ JOB END NOTIFICATION ]
NOTIFICATION IS TRANSMITTED TO ADDRESS DESIGNATED AT TIME OF JOB END

| ALWAYS NOTIFY | NOTIFY ONLY WHEN ERROR OCCURS |

| ✓ SELECT FROM ADDRESS BOOK | TRANSMIT TO ONESELF |

Other - User@mail.com

☐ ATTACH TRANSMISSION ORIGINAL DOCUMENT

| CANCEL SETTING | OK |

[ JOB END NOTIFICATION ]
NOTIFICATION IS TRANSMITTED TO ADDRESS DESIGNATED AT TIME OF JOB END

| ALWAYS NOTIFY | NOTIFY ONLY WHEN ERROR OCCURS |

| SELECT FROM ADDRESS BOOK | TRANSMIT TO ONESELF |

User-1@mail.com

✓ ATTACH TRANSMISSION ORIGINAL DOCUMENT

| CANCEL SETTING | OK |

IMAGE PROCESSING APPARATUS, CONTROL METHOD FOR IMAGE PROCESSING APPARATUS, AND STORAGE MEDIUM

BACKGROUND OF THE INVENTION

Field of the Invention

The present invention (the present disclosure; the same applies hereinafter) relates to an image processing apparatus such as a multifunction peripheral or the like, a control method for the image processing apparatus, and a storage medium.

Description of the Related Art

The present invention relates to an image processing apparatus such as an MFP (multifunction peripheral) or the like that has various functions such as a transmission unit and the like. In particular, the present invention relates to an MFP that has a function of notifying a result (job performance result) obtained by performing a job and/or a part of a transmission image, via an electronic mail (E-mail), to an address that is associated with a user who has been subjected to a user authentication and/or to an address that has been registered in an address book.

In the MFP, a function of notifying, via an E-mail, a job performance result as a job end notification mail to a designated transmission destination is widely known. Usually, a user who intends to perform a job and a user who actually operates the MFP are often the same, but there is a case where these users are different from each other. For this reason, there is a case where a transmission destination of a job end notification mail is not only made an address of a user own who has subjected to user authentication and logged in (hereinafter referred to as "own mail address") but also made an address registered in an address book of the MFP.

The content of the job end notification mail to be notified includes the transmission destination, the job performance result, the number of pages of an original document transmitted (hereinafter called a transmission original document), a job acceptance time, and the like. However, the job end notification mail does not include information related to the content of the transmission original document. For this reason, it is difficult to identify the content of the transmission original document in case of confirming the job end notification mail later.

Therefore, it has been proposed to attach a thumbnail image of the transmission original document to the job end notification mail such that the content of the transmission original document can be easily confirmed. For example, Japanese Patent Application Laid-Open No. 2004-157595 discloses an image processing apparatus that creates thumbnail image data of an original document actually transmitted, attaches a thumbnail image of the first page of the original document to a job end notification mail, and transmits the job end notification mail to a mail address of a job request source. Thus, a user can easily confirm a job performance result related to when, where and what kind of original document was transmitted.

On the other hand, some MFPs have a function of limiting an address of a transmission job to "own mail address" (hereinafter, referred to as a "limit mail transmission to oneself" function) from the viewpoint of preventing information leakage.

When an administrator makes the "limit mail transmission to oneself" function effective, it is impossible to newly input an E-mail address as the transmission destination of the MFP. Besides, an E-mail address in the address book is not displayed even if it has been registered. Besides, even in case of calling a mode memory and trying to perform transmission to a transmission destination registered as an E-mail address in the past, an error occurs when the transmission destination is different from the "own mail address" set by the administrator, so that the transmission is impossible. Therefore, a user cannot transmit an E-mail to mail addresses other than the "own mail address".

However, even when the "limit mail transmission to oneself" function is being set, there is a request that a user who intends to perform a job wants to know a job performance result without going directly to the MFP. Therefore, for example, Japanese Patent Application Laid-Open No. 2013-243541 proposes an image processing apparatus that does not limit a transmission destination of a job end notification mail to only a user's own mail address, even when the "limit mail transmission to oneself" function has been set.

As described above, the job end notification mail is intended to notify the job performance result, and does not transmit the original document itself. Therefore, as in Japanese Patent Application Laid-Open No. 2013-243541, it is appropriate to be able to transmit the job end notification mail even when the "limit mail transmission to oneself" function is effective. Besides, considering that a user who intends to perform a job and a user who actually operates the MFP may be different, the job end notification mail may be transmitted to an address other than the user who is operating the MFP.

However, in a case where a part of a transmission original document is attached to a job end notification mail, a user who has received the job end notification mail can know a part of the content thereof.

For this reason, in a case where a malicious user transmits a job end notification mail to which a part of an original document has been attached to something other than "own mail address," there is a risk that information will be leaked to the outside.

SUMMARY OF THE INVENTION

The present invention is directed to an image processing apparatus that is characterized by:
  reading an original document and generating image data;
  performing transmission of an electronic mail to which the image data is attached;
  according to an end of the transmission of the electronic mail, performing transmission of an end notification mail for notifying the end of the transmission of the electronic mail;
  setting a transmission destination to which the end notification mail is transmitted; and
  according to the transmission destination, deciding whether or not to permit the attachment of the image data to the end notification mail.

Further features of the present invention will become apparent from the following description of exemplary embodiments with reference to the attached drawings.

BRIEF DESCRIPTION OF THE DRAWINGS

FIGS. 13A and 13B are diagrams for describing examples of the job end notification setting screen.

DESCRIPTION OF THE EMBODIMENTS

Hereinafter, embodiments that are modes for carrying out the present invention will be described with reference to the attached drawings. However, the constituent elements described in each of the following embodiments are merely examples, and are not intended to limit the scope of the present invention thereto.

(First Embodiment)

Figure 1:
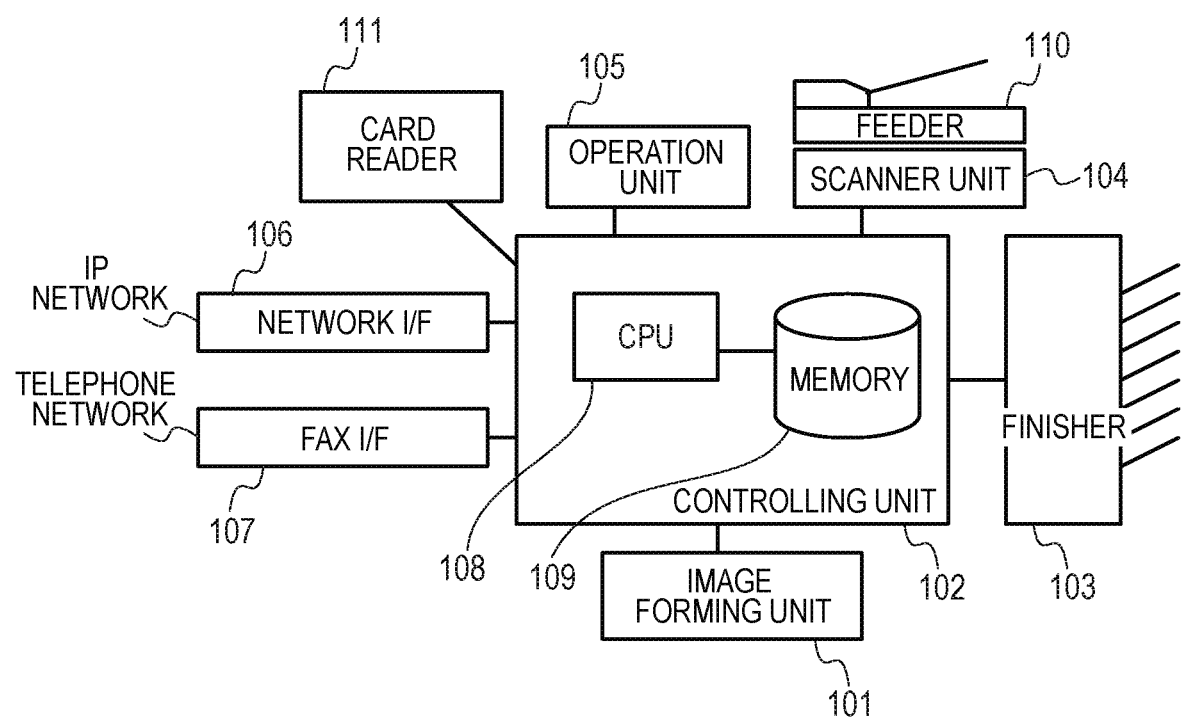
FIG. 1 is a schematic diagram for describing a hardware constitution of an MFP.

FIG. 1 is a block diagram for describing an outline of a hardware constitution of an MFP 100 according to the embodiment of the present invention.

The MFP 100 includes an image forming unit 101 that forms an image on a recording paper by a method such as an electrophotographic method, and a controlling unit 102 that comprehensively controls the MFP 100. Besides, the MFP 100 includes a finisher 103 that performs a post-process such as a stapling process, a scanner unit 104 that reads an original document placed on a document table, and an operation unit 105 that inputs various data and commands.

Also, the MFP 100 includes a network I/F (interface) 106 that transmits and receives image data via a network, and a fax I/F 107 that transmits and receives fax data.

As a reading unit, the scanner unit 104 is provided with an automatic original document feeder (feeder) 110 that reads an image while sequentially feeding a plurality of original documents.

Also, the MFP 100 includes a card reader 111 that performs user authentication for permitting login.

Each of such hardware 101, 103 to 107, 110 and 111 is connected to the controlling unit 102 via a dedicated interface.

The main part of the controlling unit 102 is constituted by a CPU (central processing unit) 108 and a storage device (memory) 109. In the memory 109, control programs corresponding to the flowcharts later described with reference to FIGS. 11, 12, 14 and 15 are stored. Besides, in the memory 109, control programs of setting dialog boxes, contents in which operation screen information is described, and the like later described with reference to FIGS. 4 to 8, 10, 13A, 13B, 16 and 17 are stored.

Figure 2:
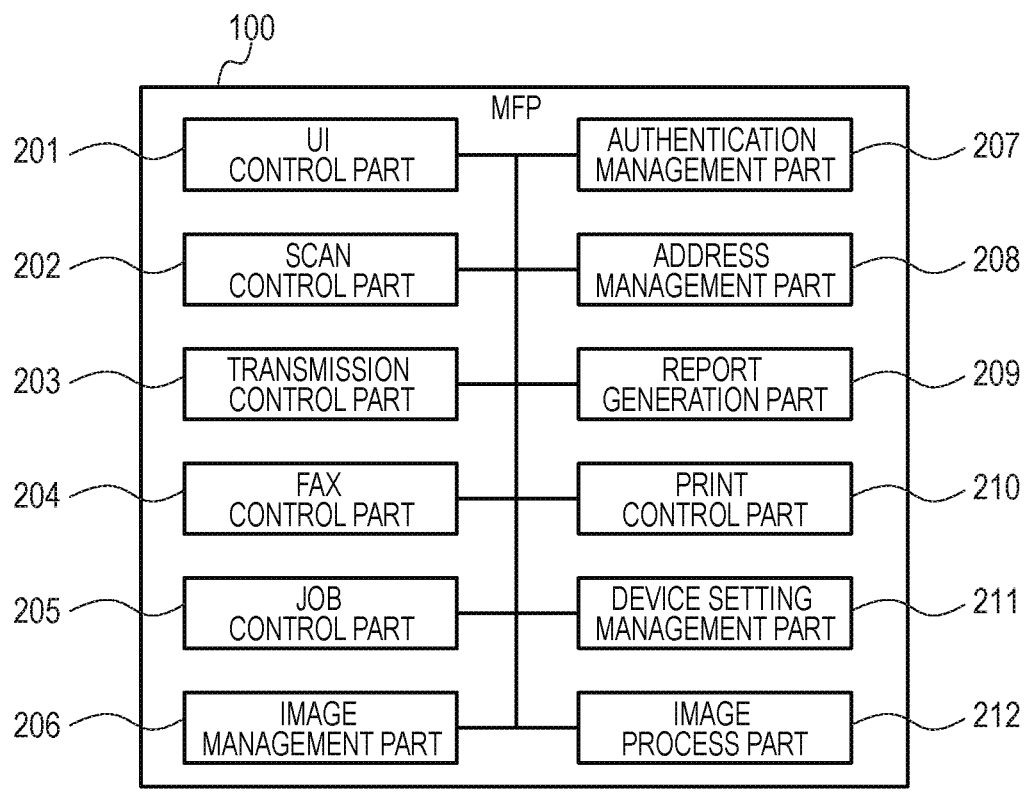
FIG. 2 is a schematic diagram for describing a software configuration of the MFP.

FIG. 2 is a block diagram for describing a software configuration for controlling the MFP 100 according to the embodiment of the present invention.

A UI (user interface) control part 201 displays an operation screen on the operation unit 105 and controls a UI that receives user operations.

A scan control part 202 controls the scanner unit 104 and the feeder 110, and controls a process of reading an image of the original document.

A transmission control part 203 controls a process of transmitting image data read by the scan control part 202 to an address designated by a user using the network I/F 106. More specifically, the transmission control part 203 controls E-mail transmission, and transmission to a file server or the like.

A fax control part 204 controls transmission/reception of G3 fax by using the fax I/F 107.

A job control part 205 manages a user's transmission request accepted by the UI control part 201, and its performance state and history.

An image management part 206 manages management information of the image read by the scanner unit 104.

An authentication management part 207 identifies the user who uses the MFP 100 on the basis of the information read by the card reader 111 and the information input by the user from the operation unit 105, and manages the information related to the identified user.

An address management part 208 manages transmission address information of a transmission destination, used in the transmission process. A report generation part 209 generates various types of reports that show device setting values and job performance results. Also, the report generation part generates a job end notification mail.

A print control part 210 controls printing, on paper, the image data read by the scanner unit 104, a received fax text, a transmission result report, and the like, by using the image forming unit 101.

A device setting management part 211 stores and manages various settings for the MFP 100.

An image process part 212 provides various image processing functions such as conversion, rotation, synthesis, and the like of the images stored in the image management part 206.

The software related to these parts is stored in the memory 109 and executed by the CPU 108.

Figure 3:
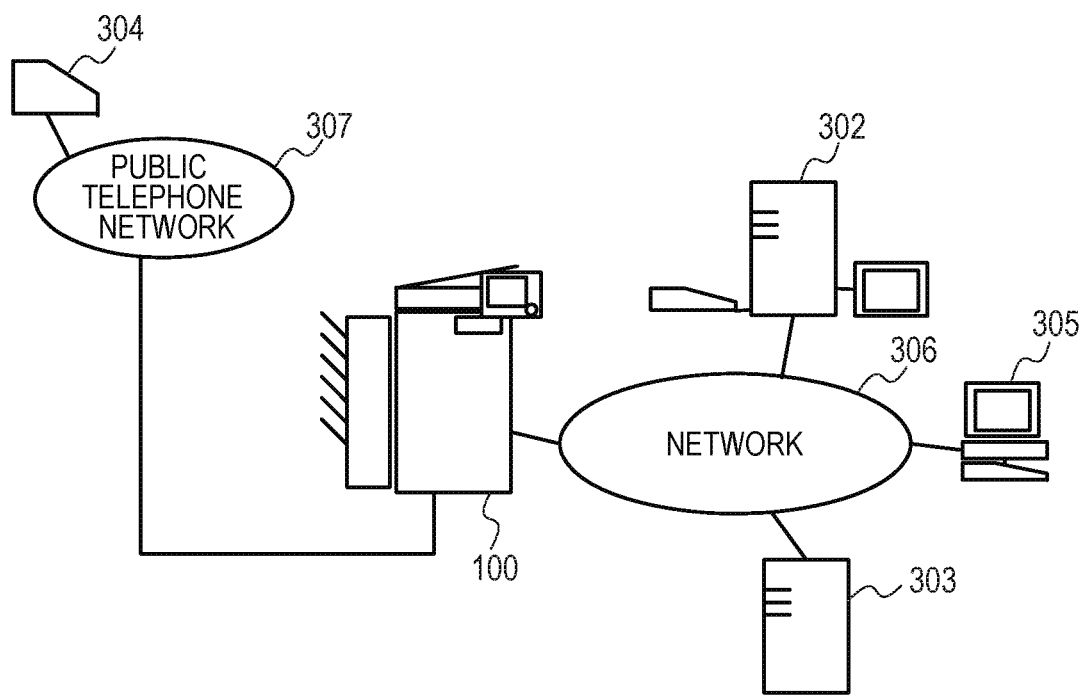
FIG. 3 is a diagram for describing a system configuration to which an embodiment is applied.

FIG. 3 is a diagram for describing a system configuration to which the present embodiment is applied.

The MFP 100 is a multifunction machine to which the present embodiment is applied. The MFP 100 is connected via a network 306 to a file server 302 that is a transmission address of a network scan, an SMTP (Simple Mail Transfer Protocol) server 303 that is used for E-mail transmission, and a client PC (personal computer) 305 that receives an E-mail.

A fax device 304 is a G3 FAX and is connected to the MFP 100 via a public line network 307.

A user can transmit an E-mail to a desired address by designating detailed settings such as a transmission address, a transmission time, and the like from the operation unit 105 of the MFP 100.

Figure 4:
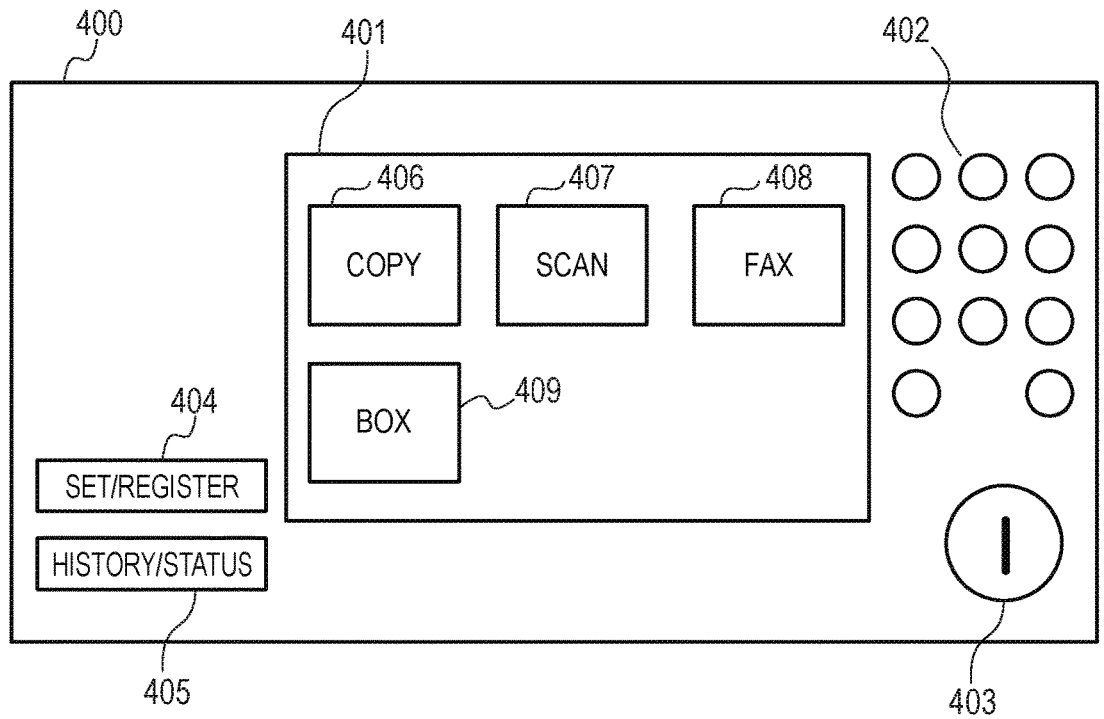
FIG. 4 is a diagram for describing an example of a home screen.

FIG. 4 is a diagram for describing an example of a home screen 400 to be displayed on the operation unit 105.

In an application selection area 401, various buttons for respectively selecting applications that call various operation screens according to user's instructions are displayed. In the example of FIG. 4, a "COPY" button 406, a "SCAN" button 407, a "FAX" button 408 and a "BOX" button 409 are displayed in the application selection area 401.

When the "COPY" button 406 is pressed, an operation screen (not illustrated) of a copy function is called.

When the "SCAN" button 407 is pressed, an operation screen of a network scan function (a scan operation screen 500 of FIG. 5) is called.

When the "FAX" button 408 is pressed, an operation screen (not illustrated) of a fax function is called.

When the "BOX" button 409 is pressed, an operation screen (not illustrated) of a box function is called.

The operation unit 105 also includes a ten-key pad 402, and a start key 403 for instructing a start of a job.

Further, a "SET/REGISTER" button 404 and a "HISTORY/STATUS" button 405 are also displayed.

Figure 10:
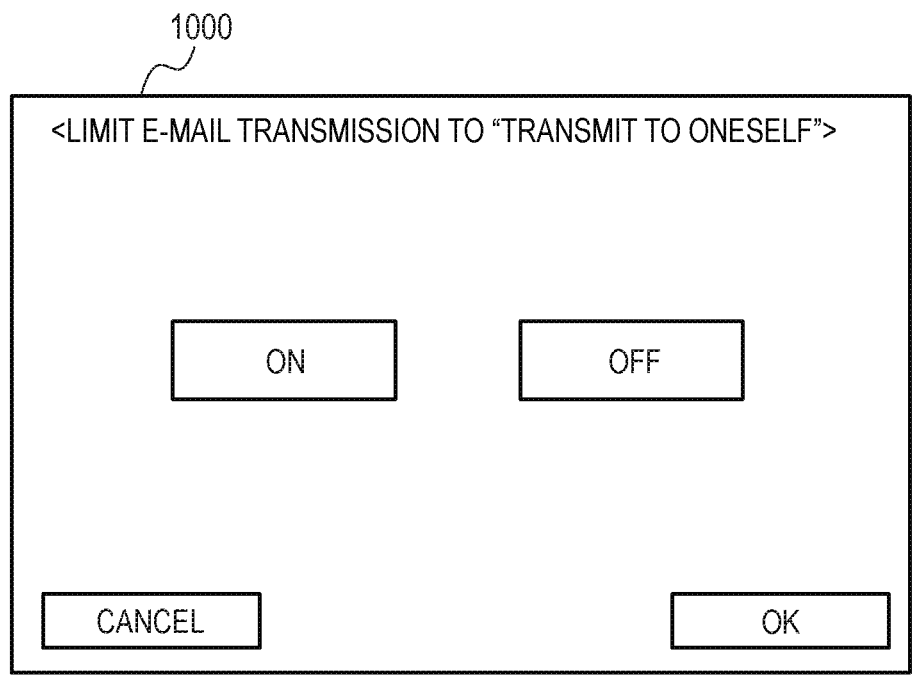
FIG. 10 is a diagram for describing an example of a "limit mail transmission to oneself" setting screen.

When the "SET/REGISTER" button 404 is pressed, the setting screen (a "limit mail transmission to oneself" setting screen 1000 of FIG. 10) of the MFP 100 is called.

When the "HISTORY/STATUS" button 405 is pressed, a job history/status screen (not illustrated) is called.

Figure 5:
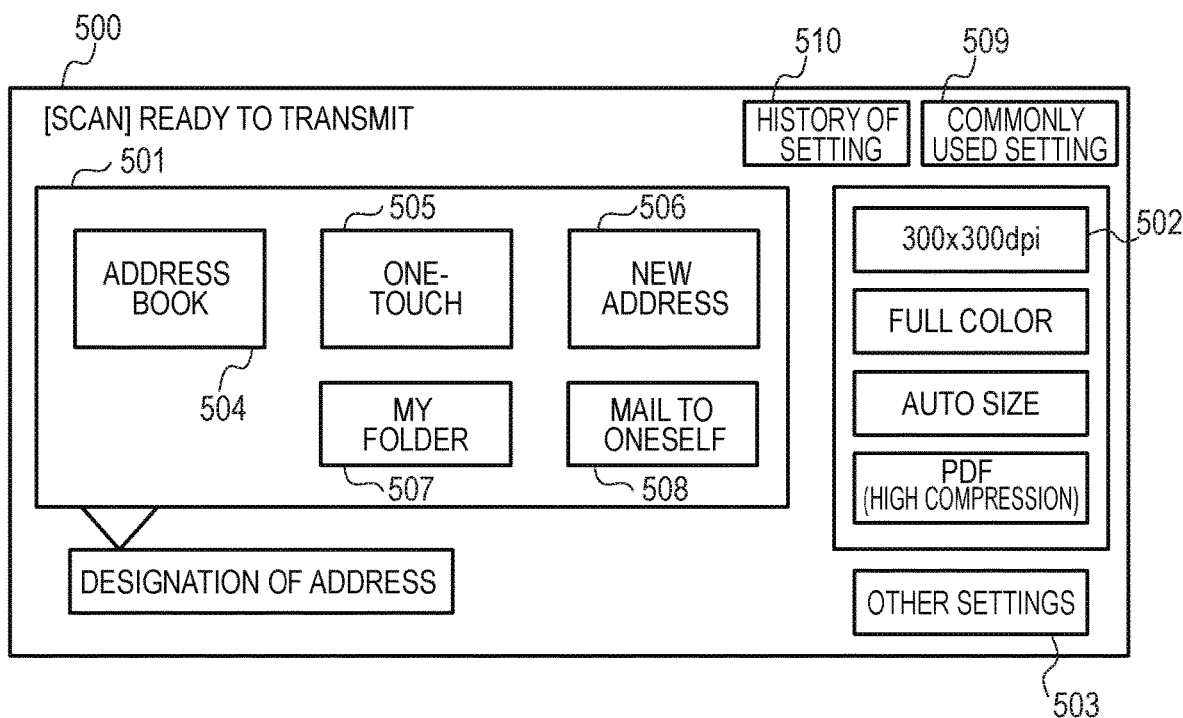
FIG. 5 is a diagram for describing an example of a scan operation screen.

FIG. 5 is a diagram for describing an example of the scan operation screen 500 to be displayed on the operation unit 105 by pressing the "SCAN" button 407 on the home screen 400 of FIG. 4.

In a transmission destination setting area 501, various buttons for enabling to designate a transmission destination of a scanned original document are displayed.

When an "ADDRESS BOOK" button 504 is pressed, an address book screen (FIGS. 6A and 6B) is displayed. On the address book screen, a user can select a desired address from registered addresses displayed in a list, and set the selected address as a transmission destination.

When a "ONE-TOUCH" button 505 is pressed, a one-touch button selection screen (not illustrated) is displayed. On the one-touch button selection screen, a user can set a desired address as a transmission destination by pressing the button of the desired address from registered one-touch buttons.

When a "NEW ADDRESS" button 506 is pressed, a transmission type selection screen (not illustrated) is displayed. When a transmission type is selected on the transmission type selection screen, an address setting screen (not illustrated) corresponding to the selected transmission type is displayed. Then, a user can set a transmission destination by inputting necessary information for each transmission type on the address setting screen.

When a "MY FOLDER" button 507 is pressed, an address of a folder of a file server associated with a user (logged-in user) who is operating the MFP 100 is set as a transmission destination of a scanned original document.

When a "MAIL TO ONESELF" button 508 is pressed, an E-mail address associated with a user who (logged-in user) is operating the MFP 100 is set as a transmission destination of a scanned original document.

The user can input the transmission destination by any of the above methods.

Various transmission basic setting buttons 502 are used to set reading conditions such as reading resolution, a reading color mode and the like, a transmission file format, and the like.

When an "OTHER SETTINGS" button 503 is pressed, a screen (not illustrated) that allows various detailed settings for reading and transmitting is called.

When a "COMMONLY USED SETTING" button 509 is pressed, a "commonly used setting" screen (not illustrated) on which buttons corresponding to the stored transmission settings are displayed is called.

When a "HISTORY OF SETTING" button 510 is pressed, a screen (not illustrated) that displays the settings of the transmission jobs performed in the past is called.

Figure 6A:
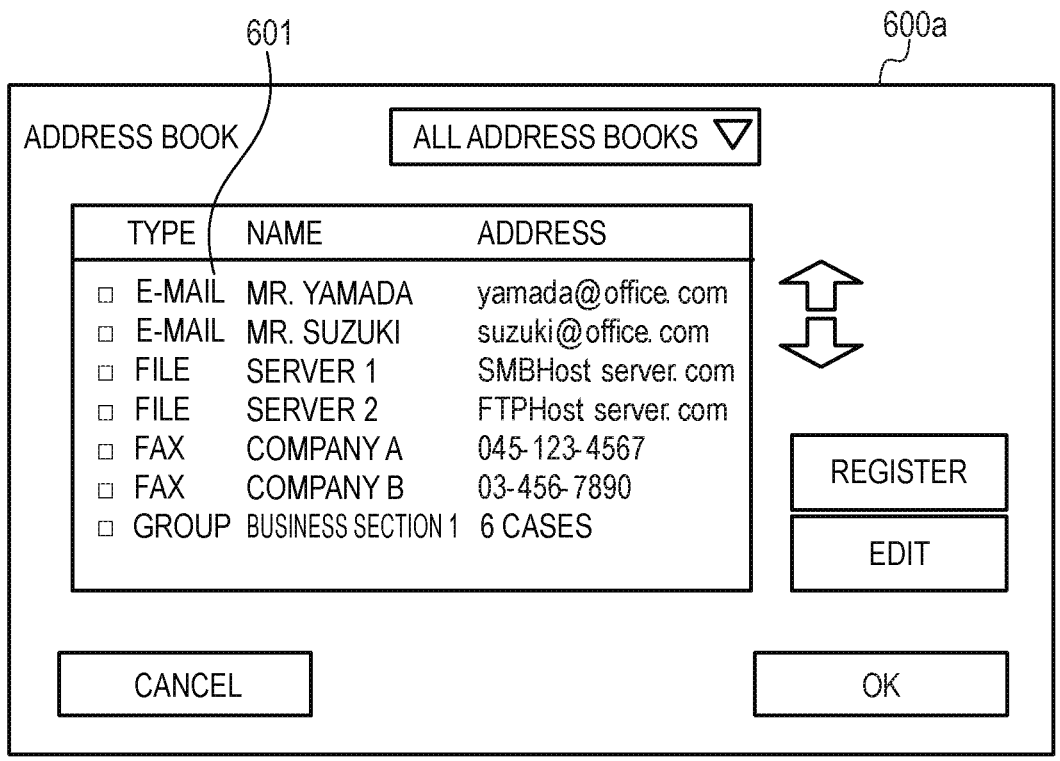
FIGS. 6A and 6B are diagrams for describing an example of an address book screen.
Figure 6B:
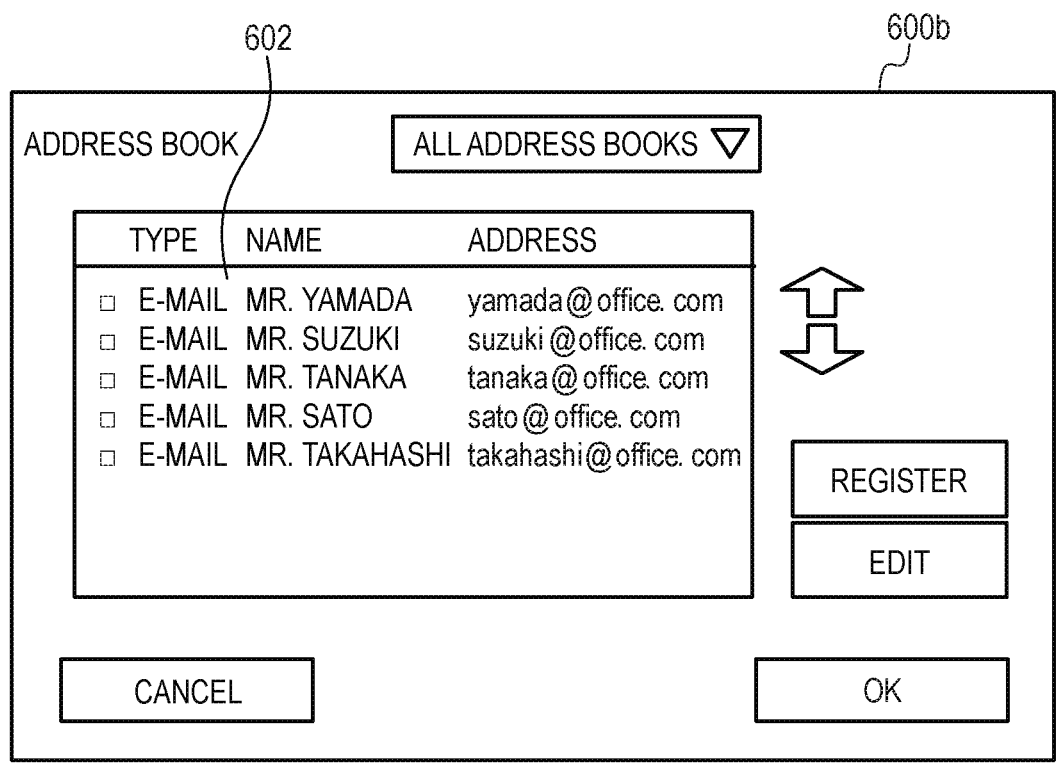

FIGS. 6A and 6B are the diagrams for describing an example of the address book screen to be displayed on the operation unit 105 by pressing the "ADDRESS BOOK" button 504 on the scan operation screen 500 of FIG. 5.

FIG. 6A shows an example of an address book screen 600a in a case where all the addresses registered in the address book are displayed. On the other hand, FIG. 6B shows an example of an address book screen 600b in a case where only the E-mail addresses are displayed among the addresses registered in the address book.

A user can select a desired address from an address list 601 displayed on the address book screen 600a or an address list 602 displayed on the address book screen 600b, and set the selected address as a transmission destination of a scanned original document.

Incidentally, address data is stored in the storage device 109 and managed by the address management part 208.

Figure 7:
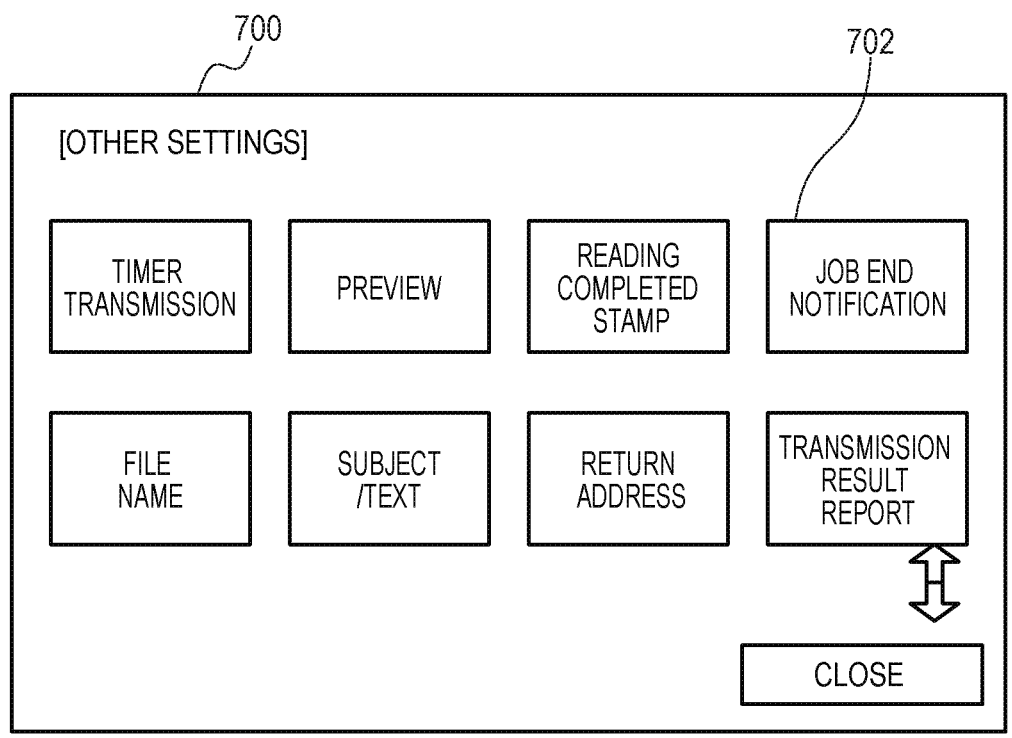
FIG. 7 is a diagram for describing an example of an other settings screen.

FIG. 7 is a diagram for describing an example of an other settings screen 700 to be displayed on the operation unit 105 by pressing the "OTHER SETTINGS" button 503 on the scan operation screen 500 of FIG. 5.

On the other settings screen 700, it is possible to perform settings related to transmission jobs other than the transmission basic settings such as the reading resolution, the reading color mode, the transmission file format, and the like.

In the example of FIG. 7, various buttons for setting functions such as "TIMER TRANSMISSION" for designating a transmission time, "PREVIEW" for displaying an image of a scanned original document before transmission, "READING COMPLETED STAMP" for putting a stamp indicating that reading has been completed on an original read from the feeder, and the like are displayed.

Besides, a "JOB END NOTIFICATION" button 702 that allows setting of a job end notification function for notifying a user of a performance result of a transmission job is also displayed.

Figure 8:
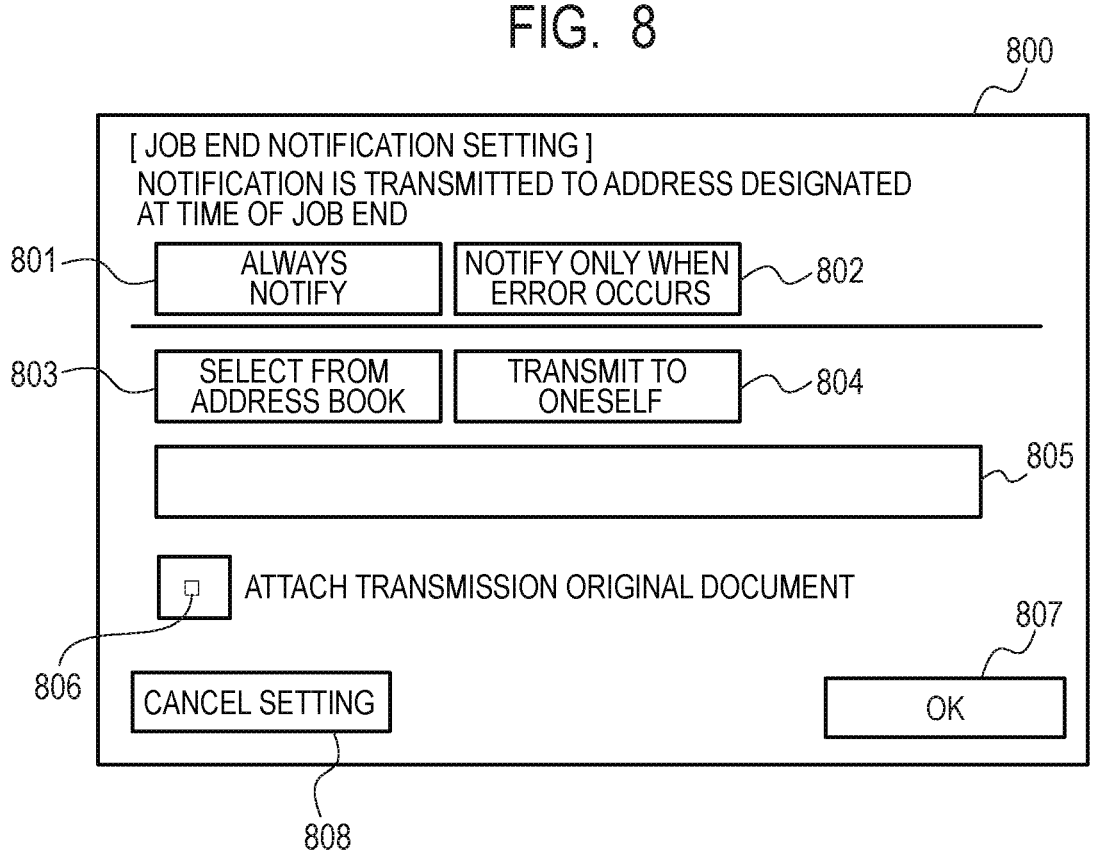
FIG. 8 is a diagram for describing an example of a job end notification setting screen.

FIG. 8 is a diagram for describing an example of a job end notification setting screen 800 to be displayed on the operation unit 105 by pressing the "JOB END NOTIFICATION" button 702 on the other settings screen 700 of FIG. 7.

On the job end notification setting screen 800, an "ALWAYS NOTIFY" button 801 and a "NOTIFY ONLY WHEN ERROR OCCURS" button 802 are displayed as buttons for setting notification conditions of the job end notification mail.

When the "ALWAYS NOTIFY" button 801 is selected, the job end notification mail is always transmitted when the job ends. When the "NOTIFY ONLY WHEN ERROR OCCURS" button 802 is selected, the job end notification mail is transmitted only when the job ends due to an error.

Besides, on the job end notification setting screen 800, a "SELECT FROM ADDRESS BOOK" button 803 and a "TRANSMIT TO ONESELF" button 804 are displayed as buttons for setting a transmission destination of the job end notification mail.

When the "SELECT FROM ADDRESS BOOK" button 803 is selected, a user can select the transmission destination of the job end notification mail from the address book. When the "TRANSMIT TO ONESELF" button 804 is selected, a user can limitingly set the transmission destination of the job end notification mail to only an "own mail address".

When the "SELECT FROM ADDRESS BOOK" button 803 is selected, the address book screen 600b as illustrated in FIG. 6B, that displays only the E-mail addresses is displayed. A user can set a transmission destination of a job end notification mail by selecting a desired address from the address list 602 displayed on the address book screen 600b.

Besides, when the "TRANSMIT TO ONESELF" button 804 is pressed, the "own mail address" is set as the destination of the job end notification mail.

The set transmission destination is displayed in a transmission destination display area 805 of the job end notification setting screen 800.

By turning on/off an "ATTACH TRANSMISSION ORIGINAL DOCUMENT" button 806, it is set whether or not to attach the first page as a part of the original document (transmission original document) transmitted by the transmission job to the job end notification mail to be transmitted.

When a user presses an "OK" button 807 in a state that various buttons on the above job end notification setting screen 800 are being selected, the selected content becomes one item of a detailed setting request.

When a "CANCEL SETTING" button 808 is pressed, the content being selected on the job end notification setting screen 800 is discarded, and the screen returns to the other settings screen 700.

Figure 9:
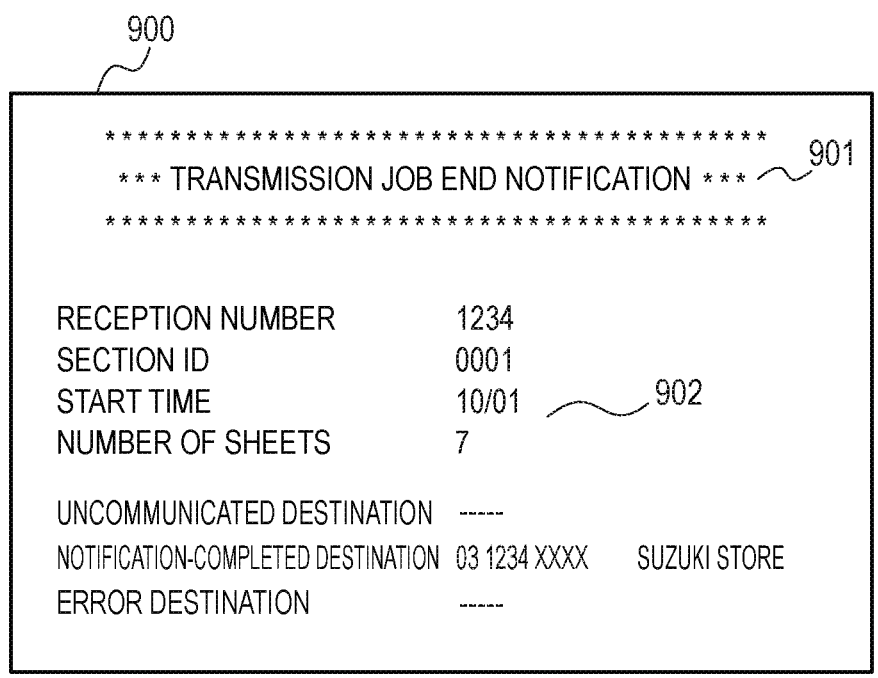
FIG. 9 is a diagram for describing an example of a job end notification mail.

FIG. 9 is a diagram for describing an example of a job end notification mail 900.

In the example of FIG. 9, the job end notification mail 900 is composed of a header 901 that indicates a transmission job end notification mail, and a body text 902. In the body text 902 of the job end notification mail, an acceptance number issued each time the MFP 100 accepts a transmission job, a department ID of a department to which a user who operated belongs, a start time of the transmission job, the total number of pages of a transmission original document, a name of a transmission destination, and the like are displayed.

Besides, in a case where the "ATTACH TRANSMISSION ORIGINAL DOCUMENT" button 806 is set to ON on the job end notification setting screen 800, the first page of the transmission original document is converted into PDF (Portable Document Format) data and attached to the job end notification mail.

FIG. 10 is a diagram for describing an example of the "limit mail transmission to oneself" setting screen 1000 to be used in case of setting the transmission destination of the job end notification mail to be limited to the address of a user oneself who is operating the MFP 100.

The "limit mail transmission to oneself" setting screen 1000 is one of the setting screens to be displayed when a user presses the "SET/REGISTER" button 404 on the home screen 400. When "ON" is set on the "limit mail transmission to oneself" setting screen 1000, it is impossible to transmit the job end notification mail to an address other than the address ("own mail address") of the user (logged-in user) who is operating the MFP 100.

Next, a process to be performed in case of performing various settings necessary for transmission job performance, such as a transmission destination of a scanned original document, a reading setting and the like, will be described with reference to a flowchart of FIG. 11. Namely, the flowchart of FIG. 11 shows the process of transmitting the scanned original document to a designated address, and this process is performed according to a user's instruction.

Figure 11:
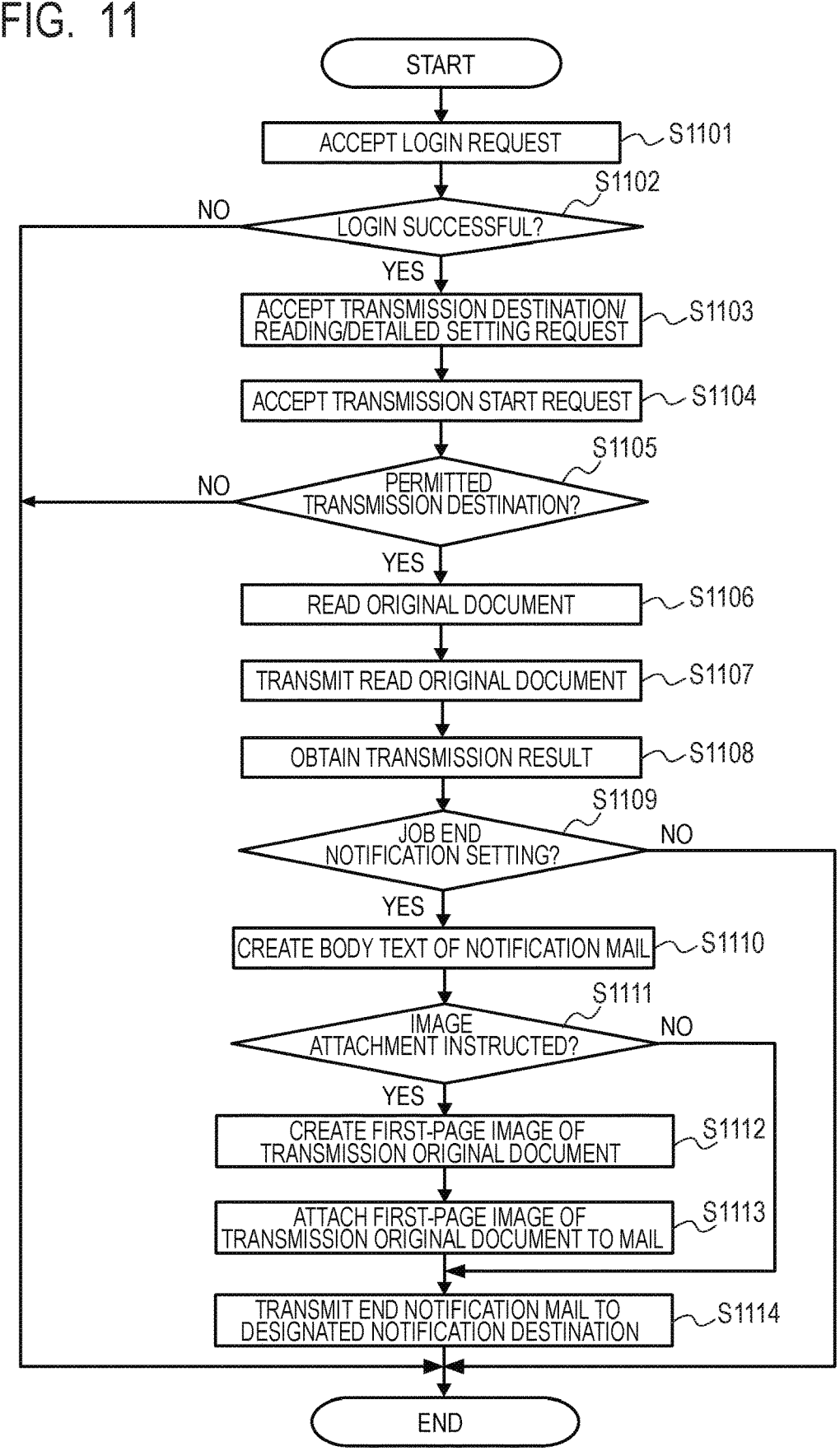
FIG. 11 is a flowchart for describing a process of making various settings for a transmission job.

A control program for performing the process shown in the flowchart of FIG. 11 is stored in the memory 109 and executed by the CPU 108.

<User Authentication by Authentication Management Part>

First, a user causes the card reader 111 to read card information including user authentication information, and logs in to the MFP 100. Thus, the authentication management part 207 accepts the user authentication request for using the MFP 100 (S1101).

The authentication management part 207 refers to a user information database stored in the memory 109, and determines whether or not the user logged in (S1101) is a user who can use the MFP 100 (S1102).

When NO is determined in S1102, the login has failed, and the process ends.

When YES is determined in S1102, the login is successful. When the login is successful, the home screen 400 as illustrated in FIG. 4 is displayed on the operation unit 105 of the MFP 100.

<Acceptance of Transmission Setting by UI Control Part>

Next, when the user presses the "SCAN" button 407 on the home screen 400, the scan operation screen 500 is displayed on the operation unit 105. When any button displayed in the transmission destination setting area 501 on the scan operation screen 500 is pressed, the UI control part 201 accepts a transmission destination setting request.

Besides, when the transmission basic setting button 502 or the "OTHER SETTINGS" button 503 is pressed, the UI control part 201 accepts a reading or the detailed setting request (S1103).

When the user presses the "OTHER SETTINGS" button 503 and then presses the "JOB END NOTIFICATION" button 702 displayed on the other settings screen 700, the job end notification setting screen 800 is displayed. When the user sets the notification conditions and a notification destination of the job end notification mail on the job end notification setting screen 800, the set contents become one item of the detailed setting request.

Once the detailed settings for the transmission address, the reading and the transmission are performed, various setting processes necessary to perform the transmission job are completed.

When the user presses the start key 403 on the home screen 400 after the completion of various setting processes for performing the transmission job, the UI control part 201 detects and accepts this fact as a start request of the transmission job (S1104).

<Transmission Destination Confirmation by UI Control Part>

After S1104, the UI control part 201 determines whether or not the transmission destination accepted in S1103 is included in addresses permitted by an administrator (S1105).

In a case where the administrator has set a "limit mail transmission to oneself" setting to "ON" on the "limit mail transmission to oneself" setting screen 1000, the transmission cannot be performed unless the transmission destination is the mail address of the user oneself who is operating the MFP 100.

When NO is determined in S1105, the process ends.

<Original Document Reading by Scan Control Part>

When YES is determined in S1105, the UI control part 201 instructs the job control part 205 to start transmitting the original document.

First, the job control part 205 instructs the scan control part 202 to read the original document. Then, the scan control part 202 reads the original document placed on the scanner unit 104, and stores the obtained read image in the image management part 206 (S1106).

<Transmission of Read Image by Transmission Control Part>

When the original document reading process in S1106 is completed, the scan control part 202 notifies the job control part 205 of the completion of the original document reading. The job control part 205 instructs the transmission control part 203 to transmit the original document read in S1106.

The transmission control part 203 attaches the read image stored in the image management part 206 in S1106 to an electronic mail (E-mail), and transmits it to the transmission destination set by the user in S1103 (S1107). Incidentally, the transmission of the read image is not limited to the transmission as the attached file of the E-mail.

When the transmission process of the read image in S1107 is completed, the transmission control part 203 notifies the job control part 205 of the performance result of the transmission job. Then, the job control part 205 obtains the performance result of the transmission job (S1108).

<Creation of Job End Notification Mail by Report Generation Part>

When the performance result of the transmission job is obtained in S1108, the job control part 205 determines whether or not there is a transmission instruction of the job end notification mail in the items of the detailed setting request set by the user in S1104 (S1109).

When YES is determined in S1109, the job control part 205 instructs the report generation part 209 to create the body text of the job end notification mail. Such an instruction includes the performance result of the transmission job, information related to processes of the transmission job such as a transmission start time and the like, the transmission destination of the job end notification mail, presence/absence of an instruction to attach the transmission original document, and the like.

The report generation part 209 refers to the information related to the transmission job included in the instruction, and creates the body text of the job end notification mail (S1110).

When NO is determined in S1109, there is no necessary process after the completion of the transmission. Therefore, the process ends.

When the body text of the job end notification mail is created in S1110, the report generation part 209 determines whether or not the instruction in S1110 includes the instruction to attach the original document (transmission original document) transmitted in S1107 to the job end notification mail (S1111).

When YES is determined in S1111, the report generation part 209 requests the image process part 212 to convert the first page of the transmission original document into PDF data.

The image process part 212 reads the first page of the transmission original document from the image management part 206 and converts it into the PDF data. Then, the image process part 212 stores the converted PDF image data in the image management part 206, and notifies the report generation part 209 of this fact (S1112).

<Transmission of Job End Notification Mail by Transmission Control Part>

The report generation part 209 transfers the transmission destination of the job end notification mail set in S1103, the body text of the job end notification mail generated in S1110, and the image data of the first page of the transmission original document created in S1112, to the transmission control part 203.

The transmission control part 203 creates the job end notification mail from the transferred body text, and attaches the image data of the first page of the transferred transmission original document to the mail (S1113).

Next, the transmission control part 203 transmits the job end notification mail attached with the first page of the transmission original document, to the designated transmission destination of the job end notification mail (S1114).

Incidentally, the image data attached to the job end notification mail is not limited to the first page of the transmission original document. Namely, all or a part of the transmission original document may be set and used within a required range, if the user can confirm the content of the transmission original document by using it.

In this way, the process ends.

When NO is determined in S1111, the report generation part 209 transfers the transmission destination of the job end notification mail set in S1103 and the body text of the job end notification mail generated in S1110 to the transmission control part 203. Then, the transmission control part 203 transmits the job end notification mail to the designated transmission destination of the job end notification mail without attaching the transmission original document (S1114).

Incidentally, in S1101 of this flowchart, it is described that the user logs in the MFP by using the card reader, but the method of logging in is not limited to this. For example, a method of inputting a login name and a password from a login screen to be displayed on the operation unit 105 may be used.

Next, display control on the job end notification setting screen 800 and a setting process of the job end notification mail will be described with reference to a flowchart of FIG. 12.

When the user presses the "COMMONLY USED SETTING" button 509 on the scan operation screen 500, a commonly used setting screen (not illustrated) is displayed. Then, when a "JOB END NOTIFICATION" button is pressed on the commonly used setting screen, the UI control part 201 displays the job end notification setting screen 800 on the operation unit 105 (S1201).

An initial value of the notification condition of the job end notification mail is set to "ALWAYS NOTIFY". Immediately after the job end notification setting screen 800 is displayed, the transmission destination of the job end notification mail has not been set, and thus the "OK" button 807 is shaded and cannot be selected. The other buttons are in a selectable state.

Incidentally, the operations to be performed when the "ALWAYS NOTIFY" button 801, the "NOTIFY ONLY WHEN ERROR OCCURS" button 802 and the "CANCEL SETTING" button 808 are respectively pressed have nothing to do with whether or not the transmission original document can be attached. For this reason, the processes to be performed when these buttons are pressed are not shown in the flowchart of FIG. 12.

\<Setting of Transmission Destination of Job End Notification Mail From Address Book\>

When the job end notification setting screen 800 is displayed, the UI control part 201 accepts an input from the user (S1202).

Then, the UI control part 201 determines whether or not the user's input is the pressing of the "SELECT FROM ADDRESS BOOK" button 803 (S1203).

When YES is determined in S1203, the UI control part 201 displays, on the operation unit 105, the address book screen 600*b* on which the address list 602 of only the E-mail addresses is displayed (S1204).

Next, when it is detected that the user has pressed the address list 602 on the address book screen 600*b*, the UI control part 201 sets the address displayed at the pressed position as the transmission destination of the job end notification mail (S1205). The set transmission destination is displayed in the transmission destination display area 805 of the job end setting screen 800.

When the transmission destination of the job end notification mail is set, the UI control part 201 removes the shading of the "OK" button 807 in the job end notification setting screen 800 so that this button can be selected (S1206).

Next, the UI control part 201 determines whether or not the "limit mail transmission to oneself" setting is ON, by referring the device setting management part 211 (S1207). Here, when the "limit mail transmission to oneself" setting is ON, the address to which the job end notification mail can be transmitted is limited to the address of the user oneself who is operating the MFP 100.

When YES is determined in S1207, the address to which the job end notification mail can be transmitted is limited to the address of the user oneself who is operating the MFP 100.

However, there is a possibility that the transmission destination of the job end notification mail set in S1204 has been set to something other than the address of the user oneself who is operating the MFP 100. When the transmission original document is attached to the job end notification mail in such a state, the first page of the transmission original document is unfavorably transmitted to an address other than the address of the user who is operating the MFP 100, so that there is a risk of information leakage.

Therefore, the UI control part 201 shades the "ATTACH TRANSMISSION ORIGINAL DOCUMENT" button 806 on the job end notification setting screen 800 such that this button cannot be selected. Thus, the user cannot attach the transmission original document to the job end notification mail (S1208).

FIG. 13A is a diagram for describing an example of a job end notification setting screen 1300*a* to be displayed on the operation unit 105 at this time.

At this time, due to the selection of the address book, the "ATTACH TRANSMISSION ORIGINAL DOCUMENT" button 806 is shaded and cannot be selected such that the first page of the transmission original document cannot be attached to the job end notification mail. That is, on the job end notification setting screen 800, the "SELECT FROM ADDRESS BOOK" button 803 and the "ATTACH TRANSMISSION ORIGINAL DOCUMENT" button 806 can be selected exclusively.

Figure 12:
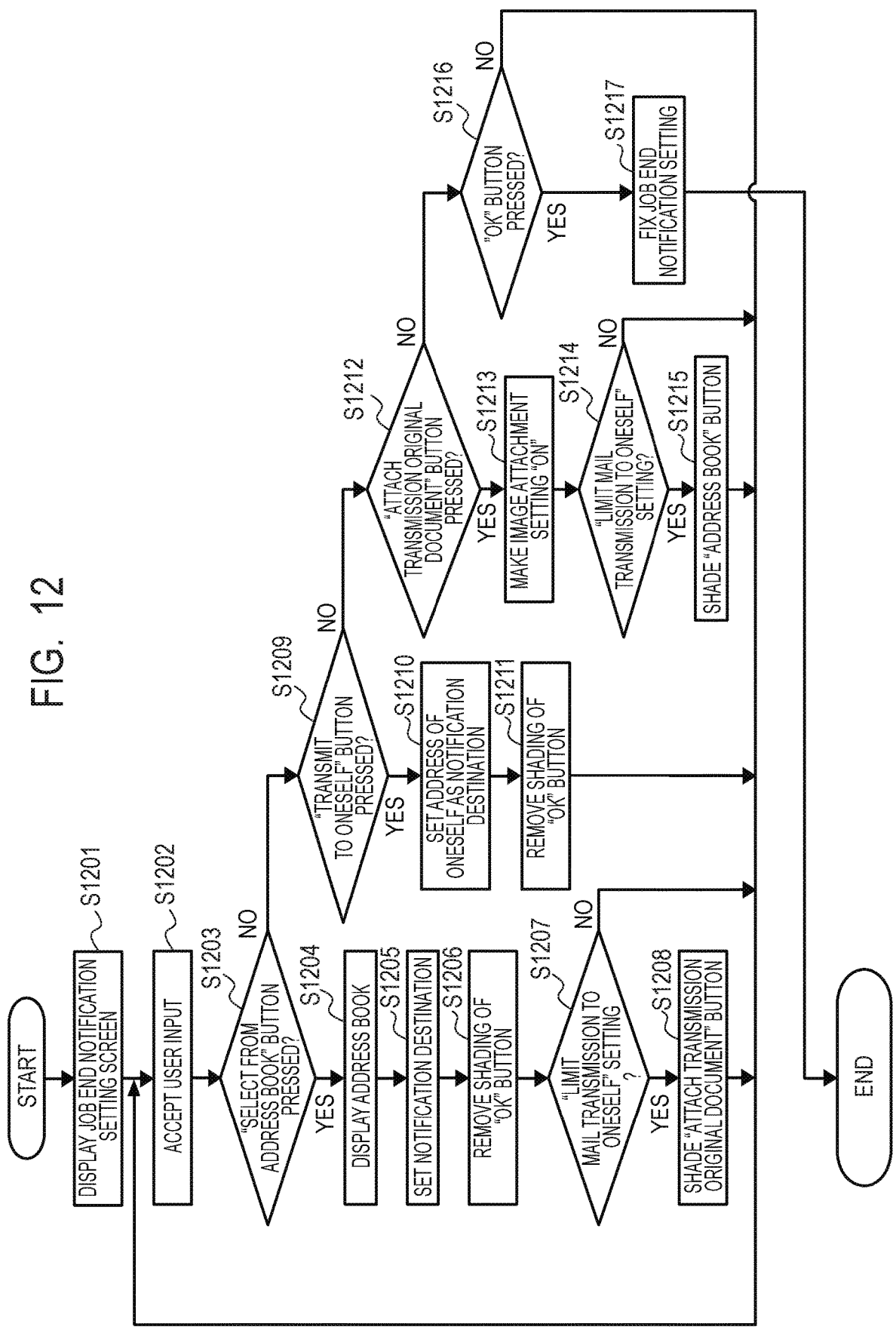
FIG. 12 is a flowchart for describing a process related to a setting of the job end notification mail in the first embodiment.

Returning to the description of the flowchart of FIG. 12, after S1208, the process returns to S1202. When NO is determined in S1207, the address to which the job end notification mail can be transmitted is not limited to the address of the user oneself who is operating the MFP 100.

Then, the process returns to S1202.

\<Setting of User'S Mail Address to Transmission Destination of Job End Notification Mail\>

When NO is determined in S1203, the UI control part 201 determines whether or not the user's input in S1202 is the pressing of the "TRANSMIT TO ONESELF" button 804 (S1209).

When YES is determined in S1209, the UI control part 201 makes an inquiry to the authentication management part 207 and sets the address of the user oneself who is operating the MFP 100 as the transmission destination of the job end notification mail (S1210). The set transmission destination is displayed in the transmission destination display area 805 of the job end notification setting screen 800.

Then, the UI control part 201 removes the shading of the "OK" button 807 so that this button can be selected (S1211). Then, the process returns to S1202.

\<Setting of Attachment of Transmission Original Document\>

When NO is determined in S1209, the UI control part 201 determines whether or not the user's input in S1202 is the pressing of the "ATTACH TRANSMISSION ORIGINAL DOCUMENT" button 806 (S1212).

When YES is determined in S1212, the UI control part 201 turns ON a flag indicating that the transmission original document is attached to the job end notification mail (S1213).

Next, the UI control part 201 determines whether or not the "limit mail transmission to oneself" setting is ON, by referring the device setting management part 211 (S1214). Here, when the "limit mail transmission to oneself" setting is ON, the address of the job end notification mail is limited to the address of the user oneself who is operating the MFP 100.

When YES is determined in S1214, the "limit mail transmission to oneself" setting is effective.

In a case where the job end notification mail is set to attach the transmission original document in S1213, when the job end notification mail is transmitted to an address other than the address of the user who is operating the MFP 100 in this state, there is a risk of information leakage.

Therefore, the UI control part 201 shades the "SELECT FROM ADDRESS BOOK" button 803, such that the user cannot set the transmission destination of the job end notification mail to other than the address of the user oneself (S1215).

FIG. 13B is a diagram for describing an example of a job end notification setting screen 1300*b* to be displayed on the operation unit 105 at this time.

After S1215, the process returns to S1202.

When NO is determined in S1214, the "limit mail transmission to oneself" setting is not effective. Then, the process returns to S1202.

\<Completion of Job End Notification Mail Setting\>

When NO is determined in S1212, the UI control part 201 determines whether or not the user's input in S1202 is the pressing of the "OK" button 807 (S1216).

When YES is set in S1216, the UI control part 201 fixes the setting of the job end notification mail (S1217), and the process ends.

When NO is set in S1216, the process returns to S1202.

As just described, in the first embodiment, in the case where the "limit mail transmission to oneself" setting is effective, when the transmission destination of the job end notification mail is the address of the user who is operating the MFP 100, this address is considered as the address that the administrator has permitted, so that the transmission original document can be attached to the job end notification mail. On the other hand, when the transmission destination of the job end notification mail is other than the address of the user who is operating the MFP 100, the transmission original document cannot be attached to the job end notification mail.

Thus, it is possible to prevent information leakage due to the job end notification mail attached with the transmission original document being transmitted to an address other than the user who is operating the MFP 100.

Incidentally, in the present embodiment, when the "SELECT FROM ADDRESS BOOK" button 803 is pressed in the state that the "limit mail transmission to oneself" setting is effective, the selected address is set as the transmission destination of the job end notification mail, and also the "ATTACH TRANSMISSION ORIGINAL DOCUMENT" button 806 is made unselectable.

However, when the "limit mail transmission to oneself" setting is effective, the "SELECT FROM ADDRESS BOOK" button 803 may be made unselectable in the initial state when the job end notification setting screen 800 is opened.

(Second Embodiment)

In the above first embodiment, there has been described the example that it is made impossible to simultaneously set the attachment of the transmission original document to the job end notification mail and set the transmission of the job end notification mail to the destination other than the address of the user (logged-in user) who is operating the MFP 100 (that is, it is made possible to select these settings exclusively).

However, there is a case where a user who intends to perform a job is different from a user who is actually operating the MFP 100. Therefore, there is also a request to notify a job end notification mail not to the user who is actually operating the MFP 100 but to the user who intends to perform the job.

For this reason, in the second embodiment, it is made possible to transmit the job end notification mail attached with the transmission original document even to an address other than the mail address of the user who is logged in to the MFP 100 if the relevant address is a predetermined address permitted by the administrator.

Figure 14:
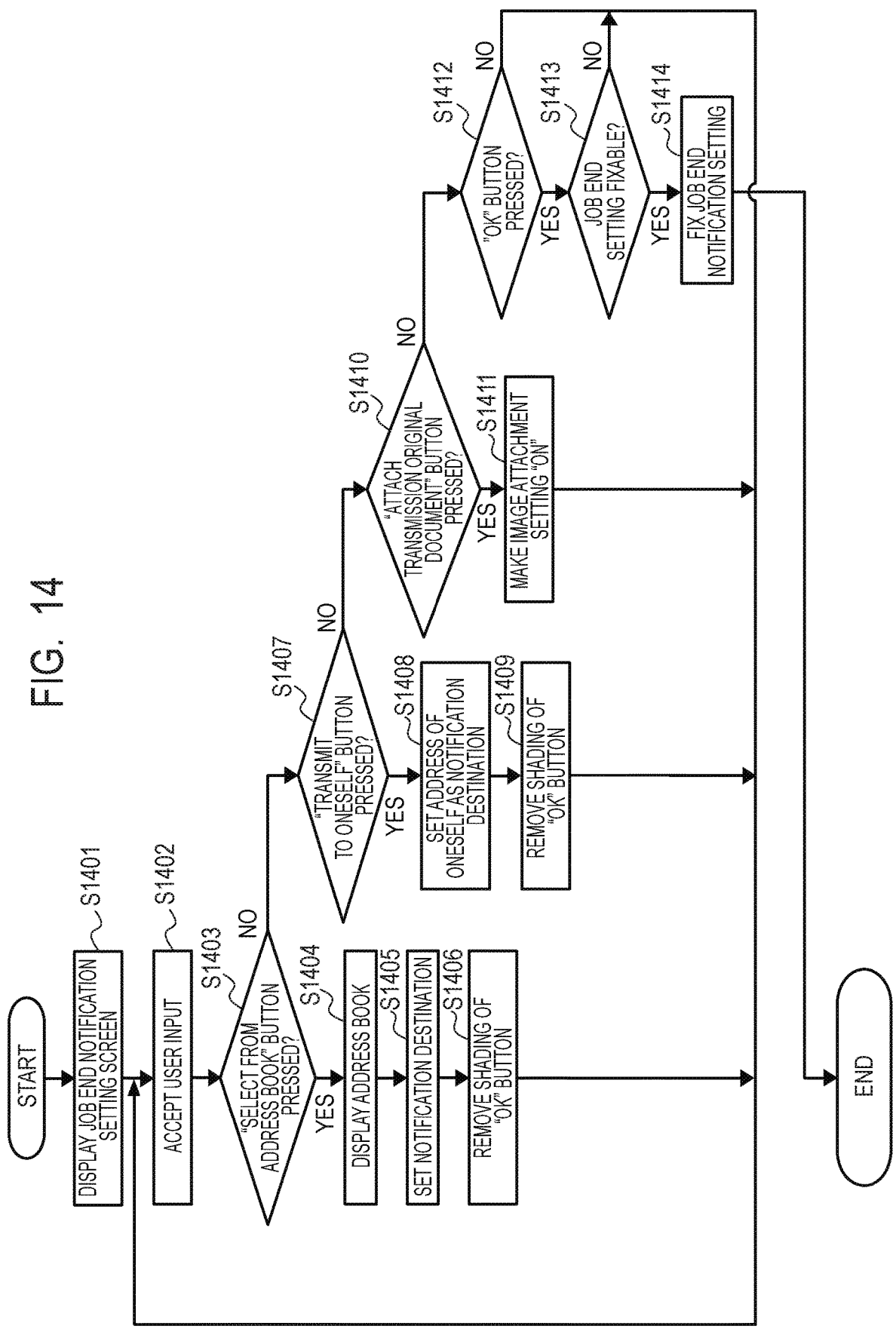
FIG. 14 is a flowchart for describing a process related to a setting of the job end notification mail in the second embodiment.

FIG. 14 is a flowchart for describing control of display on the job end notification setting screen 800 and a process of setting the job end notification mail in the second embodiment.

Incidentally, in the following description, descriptions of the same processes as those shown in the flowchart of FIG. 12 will be appropriately omitted.

In the flowchart of FIG. 14, the processes from S1401 to S1406 are the same as the processes from S1201 to S1206. However, after S1406, the process directly returns to S1402.

The processes from S1407 to S1409 are the same as the processes from S1209 to S1211.

The processes of S1410 and S1411 are the same as the processes of S1212 and S1213. However, after S1411, the process directly returns to S1402.

When NO is determined in S1410, the UI control part 201 determines whether or not the user's input in S1402 is the pressing of the "OK" button 807 (S1412).

When YES is determined in S1412, the UI control part 201 determines whether or not the current setting contents of the job end notification mail can be fixed (S1413).

When YES is determined in S1413, the UI control part 201 fixes the setting of the job end notification mail (S1414), and the process ends.

When NO is determined in S1412 or S1413, the process returns to S1402.

Figure 15:
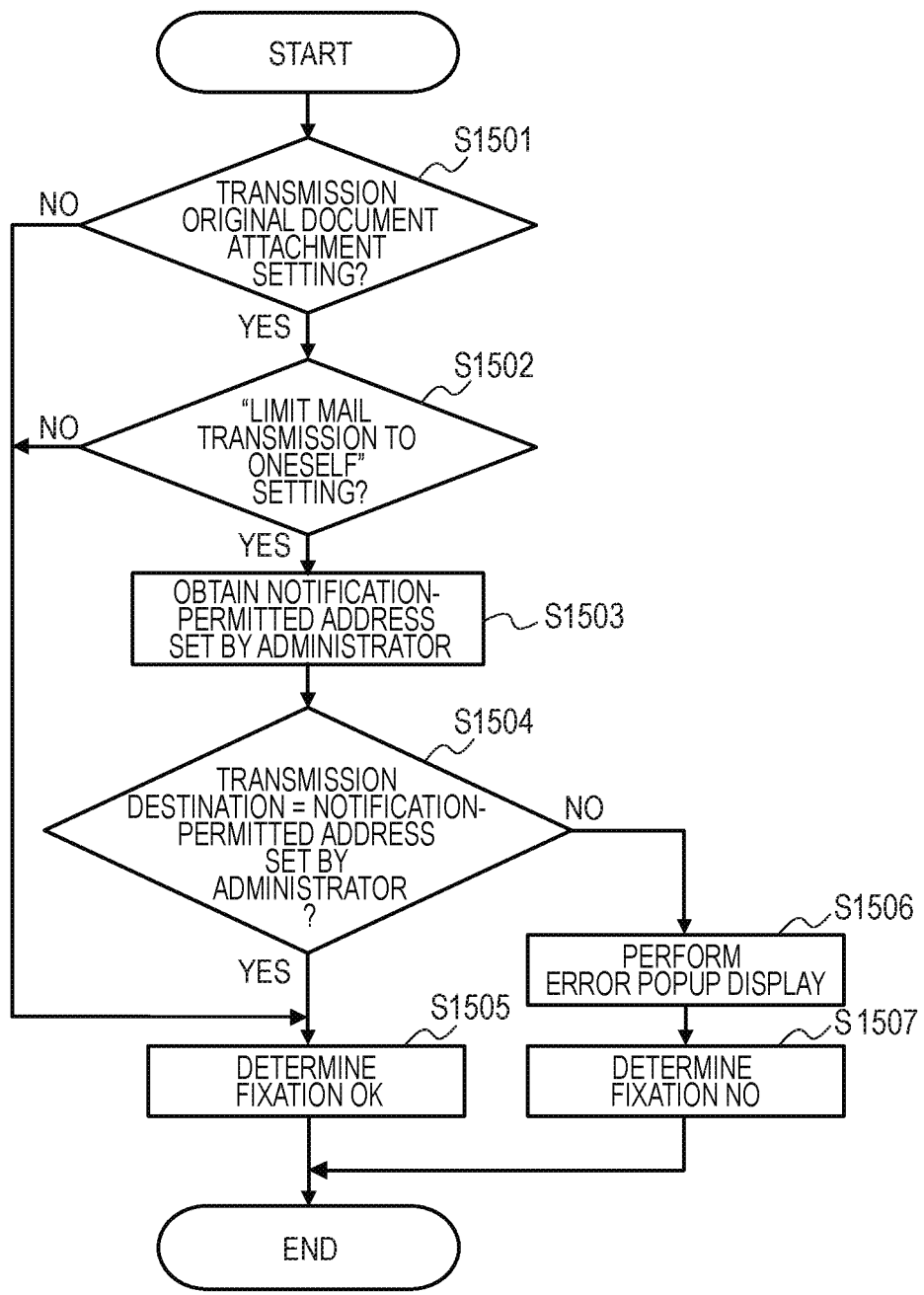
FIG. 15 is a flowchart for describing a process of determining whether or not the content of the job end notification setting can be fixed.

FIG. 15 is a flowchart for describing in detail the process in S1413 of the flowchart of FIG. 14.

First, the UI control part 201 determines whether or not the process of S1411 has been performed and a flag indicating that the transmission original document is attached to the job end notification mail is ON (S1501).

When YES is determined in S1501, the UI control part 201 refers the device setting management part 211. Then, the UI control part 201 determines whether or not the "limit mail transmission to oneself" setting, that limits the address of the job end notification mail transmission to the address of the user oneself who is operating the MFP 100, is ON (S1502).

When YES is determined in S1502, the "limit mail transmission to oneself" setting is effective.

Next, the UI control part 201 refers the device setting management part 211, and thus obtains a notification-permitted address list set by the administrator as the addresses to which transmission of the job end notification mail attached with the transmission original document is permitted (S1503).

Figure 16:
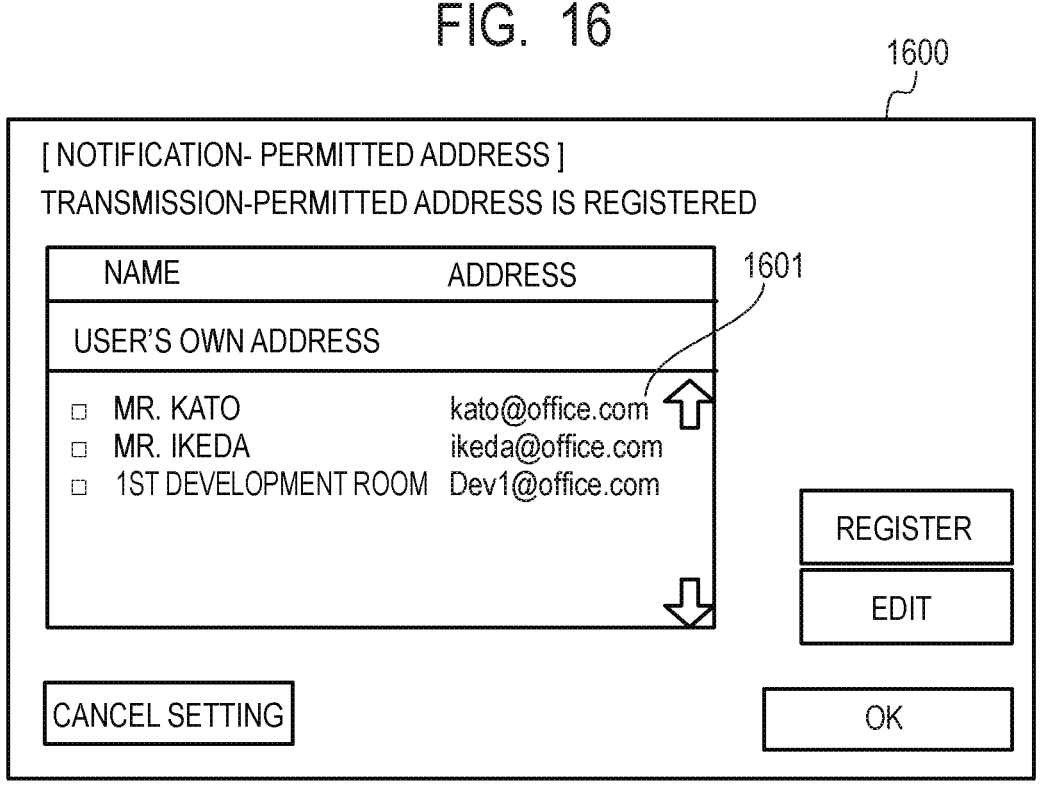
FIG. 16 is a diagram for describing an example of a notification-permitted address setting screen.

FIG. 16 is a diagram for describing an example of a notification-permitted address setting screen 1600 that is set by the administrator. On the notification-permitted address setting screen 1600, a notification-permitted address list 1601 that shows the addresses to which the job end notification mail can be transmitted is displayed. The list of transmittable addresses (transmission-permitted addresses) displayed here is managed by the device setting management part 211.

Returning to the description of the flowchart of FIG. 15, the UI control part 201 determines whether or not the transmission destination of the job end notification mail set in S1405 or S1408 is included in the notification-permitted address list 1601 obtained in S1503 (S1504).

When YES is determined in S1504, the "limit mail transmission to oneself" setting is effective, but the transmission destination of the job end notification mail is the address permitted by the administrator. Thus, the UI control part 201 determines that fixation of the job end notification setting can be performed (S1505), and the process ends.

Besides, when NO is determined in S1501 or S1502, the transmission destination of the job end notification mail is not particularly limited. Thus, the UI control part 201 determines that fixation of the job end notification setting can be performed (S1505), and the process ends.

On the other hand, when NO is determined in S1504, the transmission of the job end notification mail with the transmission original document attached to the set transmission destination is not permitted.

Therefore, the UI control part 201 displays an error popup as an error notification screen on the operation unit 105 (S1506).

Also, the UI control part 201 determines that fixation of the job end setting notification cannot be performed (S1507), and the process ends.

Figure 17:
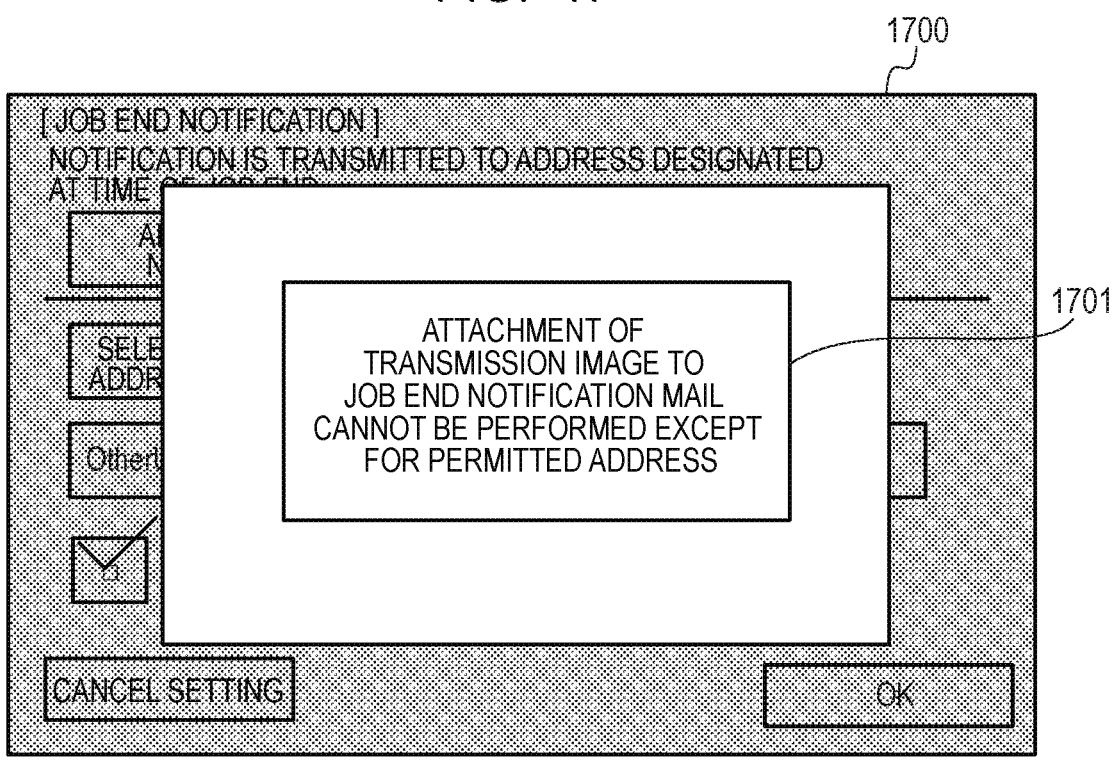
FIG. 17 is a diagram for describing an example of an error notification screen.

FIG. 17 is a diagram for describing an example of an error notification screen 1700 that is used to indicate that the fixation of the job end setting notification cannot be performed. On the error notification screen 1700, it is displayed as an error popup 1701 that the job end notification mail cannot be transmitted to the currently set address.

Incidentally, it may be possible to set a plurality of addresses as the transmission destinations of the job end notification mail on the job end notification setting screen.

In this case, in a case where the set plurality of transmission destinations of the job end notification mail are the addresses of the users operating the MFP 100 or the addresses included in the notification-permitted address list 1601, it is possible to attach the transmission original document to the job end notification mail. On the other hand, in a case where the set transmission destinations of the job end notification mail include an address other than the above addresses, the attachment of the transmission original document is not permitted to the job end notification mail to the relevant address.

As just described, in the second embodiment, even in the case where the "limit mail transmission to oneself" setting is effective, it is possible to transmit the job end notification mail with the first page of the transmission original document attached to the address other than the user who is operating the MFP 100 if the relevant address is the address permitted by the administrator.

Thus, even in the case where the user who intends to perform the job is different from the user who is actually operating the MFP 100, it is possible to notify the performance result of the job to the user who intends to perform the job.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-126617, filed Jul. 8, 2019, which is hereby incorporated by reference herein in its entirety.

What is claimed is:

1. An image processing apparatus comprising:
   one or more memories including a set of instructions stored thereon; and
   one or more processors that execute the set of instructions to:
      read an original document and generate image data of the original document;
      perform first transmission of the image data;
      control, according to a determination of a transmission destination to which an end notification mail for notifying an end of the first transmission is transmitted, whether or not to permit an attachment of the image data to the end notification mail; and
      perform second transmission of the end notification mail.

2. The image processing apparatus according to claim 1, wherein the one or more processors further execute the set of instructions to:
   permit the attachment of the image data to the end notification mail in a case where the transmission destination is an address permitted by an administrator of the image processing apparatus; and
   not permit the attachment of the image data to the end notification mail in a case where the transmission destination is an address not permitted by the administrator of the image processing apparatus.

3. The image processing apparatus according to claim 2, wherein the address permitted by the administrator is an electronic mail address of a user who has logged in to the image processing apparatus.

4. The image processing apparatus according to claim 1, wherein the one or more processors further execute the set of instructions to display that the second transmission of the end notification mail is not permitted, in a case where both the transmission destination for which the attachment of the image data to the end notification mail is not permitted and the attachment of the image data to the end notification mail are set.

5. A control method for an image processing apparatus, the control method comprising:
   reading an original document and generating image data of the original document;
   performing first transmission of the image data;
   controlling, according to a determination of a transmission destination to which an end notification mail for notifying an end of the first transmission is transmitted, whether or not to permit an attachment of the image data to the end notification mail; and
   performing second transmission of the end notification mail.

6. A non-transitory computer-readable storage medium on which is stored a computer program for making a computer execute a control method for an image processing apparatus, the control method comprising:
   reading an original document and generating image data of the original document;
   performing first transmission of the image data;
   controlling, according to a determination of a transmission destination to which an end notification mail for notifying an end of the first transmission is transmitted, whether or not to permit an attachment of the image data to the end notification mail; and
   performing second transmission of the end notification mail.

7. The image processing apparatus according to claim 1, wherein the first transmission is performed by an electronic mail to which the image data is attached.

8. An image processing apparatus comprising:
   one or more memories including a set of instructions stored thereon; and one or more processors that execute the set of instructions to:
  read an original document and generate image data of the original document;
  perform first transmission of the image data;
  in a case where a transmission destination to which an end notification mail for notifying an end of the first transmission is transmitted is selected from an address book, prohibit an attachment of the image data to the end notification mail; and
  perform second transmission of the end notification mail.

9. An image processing apparatus comprising:
one or more memories including a set of instructions stored thereon; and
one or more processors that execute the set of instructions to:
  read an original document and generate image data of the original document
  perform first transmission of the image data;
  in a case where an attachment of the image data to an end notification mail for notifying an end of the first transmission is designated, prohibit a selection of a transmission destination to which the end notification mail is transmitted from an address book; and
  perform second transmission of the end notification mail.

* * * * *